3,017,209
LOW FRICTION DAMPENED BEARING
Paul P. Thomas, Detroit, Mich., assignor to American Metal Products Company, Detroit, Mich., a corporation of Michigan
Filed July 18, 1957, Ser. No. 672,799
3 Claims. (Cl. 287—87)

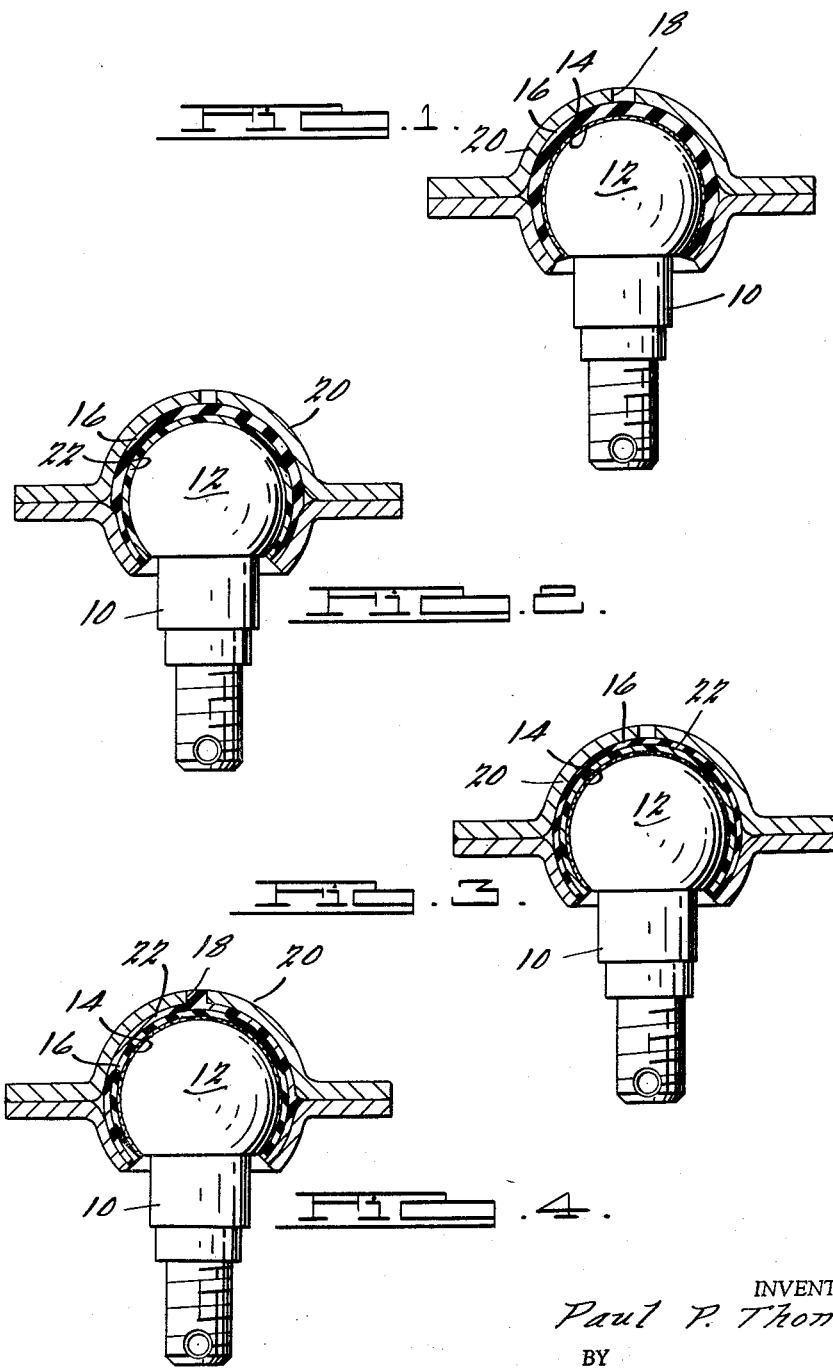

This invention relates to dampened bearings and particularly to a dampened bearing for a universal ball joint application.

The main objects of the invention are to provide a dampened bearing for use in universal ball joint applications having resilient backup material for conforming a layer of low friction material to the surface of the ball to provide a low friction bearing surface; to provide a dampened bearing for a ball joint having a low friction bearing surface backed by a split preformed rubber boot which enables the ball joint to be formed at room temperature; to provide a dampened bearing for a ball joint having a layer of low friction material conformed to the ball by rubber injected within a housing encircling the ball; to provide a dampened bearing for a ball joint which dampens vibration, isolates noise, compensates for any deviation from true roundness in the ball, and absorbs thrust; to provide a dampened bearing for a ball joint which is relatively inexpensive to manufacture, rugged in construction, and effective in use.

Other objects and features of novelty of the invention will be specifically pointed out or otherwise become apparent when referring, for a better understanding of the invention, to the following description taken in conjunction with the accompanying drawing wherein:

FIGURE 1 is a sectional view of a ball joint construction embodying features of the invention;

FIG. 2 is a view similar to that of FIG. 1 illustrating another form of the invention;

FIG. 3 is a view similar to that of FIG. 1 illustrating still another form of the invention; and FIG. 4 is a view similar to that of FIG. 1 illustrating still another form of the invention.

Referring to FIG. 1, a ball joint construction embodying features of the invention is comprised of a stud 10 having an enlarged ball 12 on one end thereof. A layer of Teflon or other low friction material 14 is disposed about the ball 12, and a rubber backing material 16 is injected through an aperture 18 in a split housing 20 encircling the ball 12 to conform the layer of low friction material 14 to the ball to provide a low friction bearing surface therefor.

This procedure is very similar to that described in the copending application of Charles S. White, Serial No. 619,782, filed on November 1, 1956, now abandoned, and assigned to the assignee of the present invention wherein a hardenable backing material is injected within a housing similar to the housing 20 to conform a layer of Teflon to a ball. Reference is made to this copending application for a better understanding of the procedure for injecting material for conforming the layer of low friction material 14 to the ball 12 in the above described manner. The pressure under which the rubber backing 16 is injected into the housing 20 may be varied, but preferably the pressure is such that a relatively hard rubber backing is provided which will stand up under more severe applications. As disclosed in the aforesaid application, molding adapters are provided at the bottom of the housing 20 for sealing the opening therein during the molding operation.

If desired, the rubber backing 16 can be made in the form of a pre-formed boot having the layer of low friction material 14 bonded to the inner surface thereof. The boot may then be slipped over the ball as a separate unit. Also the layer of low friction material 14 may first be positioned over the ball and a preformed rubber boot slipped thereover to conform it to the ball to provide the low friction bearing surface. It will be observed that the housing 20 is split with the separate halves welded, or otherwise secured together, to facilitate the positioning of the housing about the ball 12 so as to securely clamp the rubber backing.

When a rubber backup boot is employed as just described, the outside diameter of the boot is preferably made greater than the inside diameter of the housing 20 so that when the housing is clamped it will compress the rubber to take up any sheet metal or ball diameter tolerance variations, as well as place the rubber under pressure so that it will withstand more severe applications. It is also apparent that when a rubber backup boot is used, the ball joint may be assembled at room temperatures in a relatively simple manner.

With the ball joint construction illustrated in FIG. 1, it is apparent that the rubber backing 16 will yield to compensate for slight variations in the roundness of the ball 12 as it rotates. Further, the rubber backing will greatly isolate noises, dampen vibration, and absorb a substantial amount of thrust. Still further, because of the low friction bearing surface in contact with the ball, there is substantially no torque transmitted to the rubber backing.

Referring to FIG. 2, a layer of low friction, resin bearing material 22 may be cast or molded about the ball 12 to serve as a bearing surface in place of the layer of low friction material 14. Reference is again made to the aforesaid copending application of Charles S. White for a complete description of the materials and procedure for molding a low friction, resin material about a ball in this manner. In the White application, the resin material serves as a rigid backing material for conforming a layer of Teflon to a ball and does not necessarily have low friction characteristics, but the same molding procedures are applicable. After the ball 12 is provided with the molded layer of low friction resin bearing material 22, the housing 20 is disposed thereabout and the rubber backing 16 is injected within the housing as previously described, or the rubber backing material may be slipped over the resin bearing material 22 as a separate boot before the housing is positioned about the ball.

A number of materials are suitable for use as the resin bearing material 22. Polyethylene molding compounds may be employed, two being procurable on the market, one under the name of Super-dyland, the other under the name of Marlex. Phenolic impregnated glass fibrous material procurable in the trade under the name of Durez, and a form of nylon material, procurable on the market under the name of Zytel, have also been employed, as well as a phenolic and polyethylene impregnated glass fibrous material. These materials do not have the extreme low friction characteristics of Teflon or the like but are satisfactory for some less severe applications.

Referring to FIG. 3, the layer of low friction bearing material 14, may be interposed between the resin bearing material 22 and the ball 12 so that it is conformed to the ball to provide the low friction bearing surface when the resin bearing material 22 is molded thereabout. The rubber backing 16 is then disposed about the resin bearing material 22 as previously described, either in the form of a rubber boot, or injected within the housing 20 under pressure. When the resin bearing material 22 is used as described above, a bearing surface is provided for the ball which will withstand more severe applications because of the rigid backing provided by the molded resin material 22.

Reference is again made to the aforesaid copending application of Charles S. White for a complete description of conforming the layer of low friction material 14 to a ball by the resin bearing material 22. Since the resin bearing material 22 is rigid, the ball 12 must, of course, be machined with a higher precision, more true round surface than is necessary in the construction illustrated in FIG. 1. However, as previously stated, the construction in FIG. 3 will withstand more severe applications and will still isolate noise, dampen vibration, and absorb thrust.

Referring to FIG. 4, the rubber backing material 16 is provided for conforming the layer of low friction bearing material 14 to the surface of the ball as previously described. The resin bearing material 22 is then injected through the aperture 18 in the split housing 20 to provide the final backing for supporting the ball 12 within the housing. In this construction, the rubber backing material 16 will again compensate for any deviation from true roundness of the ball since it is resilient, and the presence of the resin backing material 22 adds rigidity to enable the construction illustrated in FIG. 4 to withstand more severe applications than that illustrated in FIG. 1.

From the above description it is apparent that the present invention provides several rubber-backed ball joint constructions which will dampen vibration, isolate noise, absorb thrust, and compensate for out of roundness of the ball 12. In the embodiments illustrated, the rubber backing material 16 is preferably relatively hard, having a rating of approximately 80 durometers. However, it is to be understood that the actual hardness of the rubber used may vary depending on the application of the ball joint and that the particular construction of the ball joint selected, as illustrated in FIGS. 1 through 4, will also depend on the particular application.

What is claimed is:

1. A ball joint construction comprising a member having a ball on one end thereof, a layer of low friction material disposed about the ball on both sides of the major diameter thereof, a layer of hardened resin backing material engaging and secured to the layer of low friction material to conform it to the ball on both sides of the major diameter thereof to provide a low friction bearing surface therefor, a compressed resilient material disposed about the layer of hardened resin backing material, and a housing disposed about the compressed resilient material.

2. A ball joint construction comprising a member having a ball on one end thereof, a layer of low friction material disposed about the ball on both sides of the major diameter thereof, a layer of hardened resin backing material engaging and secured to the layer of low friction material to conform it to the ball on both sides of the major diameter thereof to provide a low friction bearing surface therefor, a preformed rubber boot disposed about the layer of hardened resin backing material, and a housing disposed about the rubber boot.

3. The invention as defined in claim 2 wherein the original outside diameter of the rubber boot is greater than the inside diameter of the housing.

References Cited in the file of this patent

UNITED STATES PATENTS

| | | |
|---|---|---|
| 941,032 | McCarthy | Nov. 23, 1909 |
| 2,292,675 | Thirty | Aug. 11, 1942 |
| 2,350,398 | Hufferd | June 6, 1944 |
| 2,350,482 | Venditty | June 6, 1944 |
| 2,455,343 | Slack et al. | Nov. 30, 1948 |
| 2,715,766 | Ricks | Aug. 23, 1955 |
| 2,727,768 | Latzen | Dec. 20, 1955 |
| 2,755,116 | Alldredge | July 17, 1956 |

FOREIGN PATENTS

| | | |
|---|---|---|
| 122,863 | Australia | Dec. 4, 1944 |
| 1,091,445 | France | Apr. 12, 1955 |